United States Patent
Nam et al.

(10) Patent No.: US 11,931,978 B2
(45) Date of Patent: Mar. 19, 2024

(54) ANTI-ICING/DE-ICING HONEYCOMB CORE COMPOSITE MATERIAL AND METHOD FOR MANUFACTURING SAME

(71) Applicant: INDUSTRY-ACADEMIC COOPERATION FOUNDATION GYEONGSANG NATIONAL UNIVERSITY, Jinju-si (KR)

(72) Inventors: Young Woo Nam, Jinju-si (KR); Hyeon Seok Choe, Jinju-si (KR); Jin Hwe Kweon, Jinju-si (KR); Rho Shin Myong, Jinju-si (KR); Won Ho Choi, Daejeon (KR)

(73) Assignee: INDUSTRY-ACADEMIC COOPERATION FOUNDATION GYEONGSANG NATIONAL UNIVERSITY, Jinju-si (KR)

( * ) Notice: Subject to any disclaimer, the term of this patent is extended or adjusted under 35 U.S.C. 154(b) by 0 days.

(21) Appl. No.: 18/020,808

(22) PCT Filed: Dec. 22, 2020

(86) PCT No.: PCT/KR2020/018853
§ 371 (c)(1),
(2) Date: Feb. 10, 2023

(87) PCT Pub. No.: WO2022/045487
PCT Pub. Date: Mar. 3, 2022

(65) Prior Publication Data
US 2023/0226785 A1 Jul. 20, 2023

(30) Foreign Application Priority Data
Aug. 27, 2020 (KR) .................. 10-2020-0108658

(51) Int. Cl.
| | |
|---|---|
| *B29D 24/00* | (2006.01) |
| *B29B 15/10* | (2006.01) |
| *B29C 70/06* | (2006.01) |
| *B29C 70/88* | (2006.01) |
| *B29L 31/30* | (2006.01) |
| *B64C 1/00* | (2006.01) |
| *B64D 15/20* | (2006.01) |
| *C08J 5/08* | (2006.01) |
| *C08L 63/00* | (2006.01) |

(52) U.S. Cl.
CPC ............ *B29D 24/005* (2013.01); *B29B 15/10* (2013.01); *B29C 70/06* (2013.01); *B29C 70/882* (2013.01); *B64D 15/20* (2013.01); *C08J 5/08* (2013.01); *C08L 63/00* (2013.01); *B29L 2031/30* (2013.01); *B29L 2031/3005* (2013.01); *B29L 2031/3076* (2013.01); *B64C 2001/0072* (2013.01)

(58) Field of Classification Search
None
See application file for complete search history.

(56) References Cited

U.S. PATENT DOCUMENTS

2013/0002514 A1   1/2013   Ziolkowski et al.

FOREIGN PATENT DOCUMENTS

| EP | 2 429 035 | * | 9/2010 |
|---|---|---|---|
| KR | 10-2018-0099378 A | | 9/2018 |
| KR | 10-1975231 B1 | | 5/2019 |
| KR | 10-2105136 B1 | | 4/2020 |
| KR | 10-2020-0008718 A | | 5/2020 |

OTHER PUBLICATIONS

International Search Report from WIPO in Application No. PCT/KR2020/018853 dated Aug. 3, 2021.
Notice to Submit a Response issued in Korean Patent Application No. 10-2020-0108658, dated Sep. 10, 2021.

* cited by examiner

*Primary Examiner* — Robert T Butcher
(74) *Attorney, Agent, or Firm* — Dilworth IP, LLC

(57) ABSTRACT

An anti-icing honeycomb core composite manufactured by forming an electromagnetic wave absorption layer by using dielectric fiber, molding the electromagnetic wave absorption layer into a honeycomb core structure by using a molded part including a first base, a second base, and an inner block, hardening the honeycomb core structure, and removing the molded part. The molding step includes first stacking, on the first base including a plurality of grooves in which the inner blocks each having a hexagonal column shape are able to be seated, a plurality of the inner blocks and a plurality of the electromagnetic wave absorption layers as the honeycomb core structure so that the electromagnetic wave absorption layer is disposed between the plurality of inner blocks, and second stacking covering the inner blocks and the electromagnetic wave absorption layers stacked on the first base with the second base having the same shape as the first base.

5 Claims, 11 Drawing Sheets

(a) Complex permittivity of dielectric fiber coated with metal (b) Complex permittivity of dielectric fiber not coated with metal Absorption performance of anti-icing honeycomb core composite according to thickness of wall surface of cell Temperature change of anti-icing honeycomb core composite over time Temperature of generation of heat of anti-icing honeycomb core composite according to output and application times of electromagnetic wave

ANTI-ICING/DE-ICING HONEYCOMB CORE COMPOSITE MATERIAL AND METHOD FOR MANUFACTURING SAME

FIELD OF THE INVENTION

The present invention relates to an anti-icing honeycomb core composite and a method of manufacturing the same, and more particularly, to an anti-icing honeycomb core composite which generates heat by effectively absorbing an electromagnetic wave through a limited structure of a honeycomb core and a method of manufacturing the same.

BACKGROUND OF THE INVENTION

When a structure, such as an aircraft, is exposed to an extreme environment, a problem, such as an increase of drag, a loss of lift, a flight performance decrease, or a loss of lives, due to a frozen surface of the structure may occur. In order to prevent a surface of a structure, such as an aircraft, from being frozen, conventionally, a chemical or mechanical method is used. For example, Korean Patent Application Publication No. 1995-7001653 discloses an invention for processing, on a surface of an aircraft, a freezing prevention fluid that contains a polymer thickening agent containing monomers.

A method of removing a frozen matter by using the chemical or mechanical method has disadvantages in that it requires consistent maintenance and repair and increases the weight of a structure, such as an aircraft. Accordingly, research on a method of removing a frozen matter by using a heating element, which does not require consistent maintenance and repair and does not increase the weight of a structure such as an aircraft, is in progress. For example, there are a method of weaving carbon fiber and applying electricity and a method of preventing a surface of a structure, such as an aircraft, from being frozen by using a method of generating heat from conductive nano particles.

However, the carbon cotton-weaved heating element or the heating element using conductive nano particles has disadvantages in that a long time is taken to heat a surface of a structure, such as an aircraft, and a rising temperature is also low due to low heat generation efficiency.

SUMMARY OF THE INVENTION

An object of the present invention is to manufacture a light heating element capable of preventing the freezing of a structure.

Another object of the present invention is to manufacture a heating element capable of preventing the freezing of a structure and having high heat preservation efficiency.

Still another object of the present invention is to manufacture a heating element capable of preventing the freezing of a structure and having high heat generation efficiency.

Still another object of the present invention is to manufacture a heating element capable of preventing the freezing of a structure and capable of selectively generating heat.

Technical objects of the present invention are not limited to the aforementioned objects, and the other objects not described above may be evidently understood from the following description by those skilled in the art.

A method of manufacturing an anti-icing honeycomb core composite according to an embodiment of the present invention for accomplishing the objects includes a forming step of forming an electromagnetic wave absorption layer by using dielectric fiber, a molding step of molding the electromagnetic wave absorption layer into a honeycomb core structure by using a molded part including a first base, a second base, and an inner block, a hardening step of hardening the honeycomb core structure, and a removal step of removing the molded part. The molding step may include a first stacking step of stacking, on the first base including a plurality of grooves in which the inner blocks are able to be seated, a plurality of the inner blocks and a plurality of the electromagnetic wave absorption layers as the honeycomb core structure so that the electromagnetic wave absorption layer is disposed between the plurality of inner blocks, and a second stacking step of covering the inner blocks and the electromagnetic wave absorption layers stacked on the first base with the second base having the same shape as the first base.

Furthermore, the inner block may be formed in a hexagonal column shape. The grooves may be formed in a length direction thereof. A cross section of the groove which is perpendicular to the length direction may have a trapezoidal shape the lengths of top side and lateral side of which are identically a first length. The shortest distance between the grooves may be the first length.

Furthermore, the first length may be 2 mm to 10 mm.

Furthermore, the forming step may include a coating step of coating the dielectric fiber with metal, and an impregnation step of impregnating, into epoxy resin, the dielectric fiber coated with the metal.

Furthermore, the coating step may include coating the dielectric fiber with the metal by using an electroless plating method.

Furthermore, the metal may include any one or more of nickel (Ni), iron (Fe), and cobalt (Co).

Furthermore, the forming step may include forming the electromagnetic wave absorption layer so that the electromagnetic wave absorption layer has a thickness of 0.117 mm to 0.468 mm.

An anti-icing honeycomb core composite according to another embodiment of the present invention for accomplishing the objects includes is an anti-icing honeycomb core composite including a plurality of holes that is formed by a gathering of a plurality of wall surfaces including an electromagnetic wave absorption layer lengthily in the length direction of the anti-icing honeycomb core composite, wherein the wall surfaces may be constructed to have a honeycomb structure including a gathering of a plurality of cells a cross section of which, which is perpendicular to the length direction, has a regular hexagonal shape, and the length of one side of the cell may be 2 mm to 10 mm.

Furthermore, each of a pair of sides of the cell which face each other may have a thickness of 0.234 mm to 0.936 mm, and each of remaining four sides of the cell may have a thickness of 0.117 mm to 0.468 mm.

Furthermore, the wall surface may be formed of the dielectric fiber on which metal has been plated.

Furthermore, the metal may include any one or more of nickel (Ni), iron (Fe), and cobalt (Co).

The details of other embodiments for accomplishing the objects are included in the description and drawings of the invention.

The anti-icing honeycomb core composite according to the present invention provides an effect in that the anti-icing honeycomb core composite can be lightly manufactured by having the honeycomb core structure.

Furthermore, the anti-icing honeycomb core composite provides an effect in that it can increase heat preservation efficiency because it can contain heated air within the hole by having the honeycomb core structure.

Furthermore, the anti-icing honeycomb core composite provides an effect in that it can increase heat generation efficiency because the anti-icing honeycomb core composite is coated with metal and the size and thickness of the cell are limited.

Furthermore, the anti-icing honeycomb core composite provides an effect in that it can select a portion that requires the generation of heat and generate heat from the selected portion because heat is generated from only a portion that absorbs an electromagnetic wave.

Furthermore, heat that is generated over time can be determined by Equation 1 and Equation 2.

DETAILED DESCRIPTION OF THE INVENTION

Figure 1:
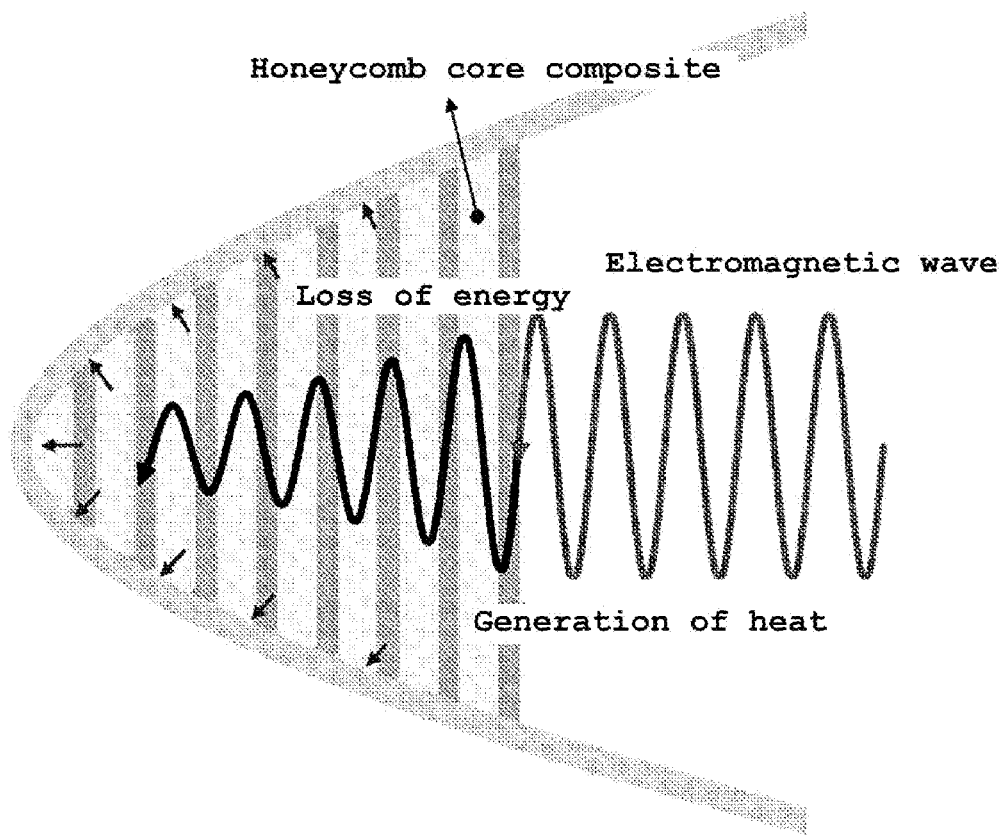
FIG. 1 is a diagram illustrating the principle of heat generation of an anti-icing honeycomb core composite according to an embodiment of the present invention.

Hereinafter, preferred embodiments of the present invention are described in detail with reference to the accompanying drawings and the following contents. However, the present invention is not limited to the embodiments described herein, and may be embodied in other forms. The same reference numerals denote the same elements throughout the specification.

Hereinafter, a method of manufacturing an anti-icing honeycomb core composite according to an embodiment of the present invention is described.

FIG. 1 is a diagram illustrating the principle of heat generation of an anti-icing honeycomb core composite according to an embodiment of the present invention.

Referring to FIG. 1, an anti-icing honeycomb core composite 1 including a dielectric may be installed in a structure, such as an aircraft, and may generate heat by absorbing an electromagnetic wave that is incident on the anti-icing honeycomb core composite 1.

When the electromagnetic wave is applied to the dielectric, molecules are rotated while changing their positive and negative directions as the electric field of the electromagnetic wave is vibrated from positive to negative and vice versa, and are arranged along the electromagnetic field. When the molecules are rotated for the arrangement, the molecules push and pull or collide with each other. Such kinetic energy raises a temperature of the dielectric.

Figure 2:
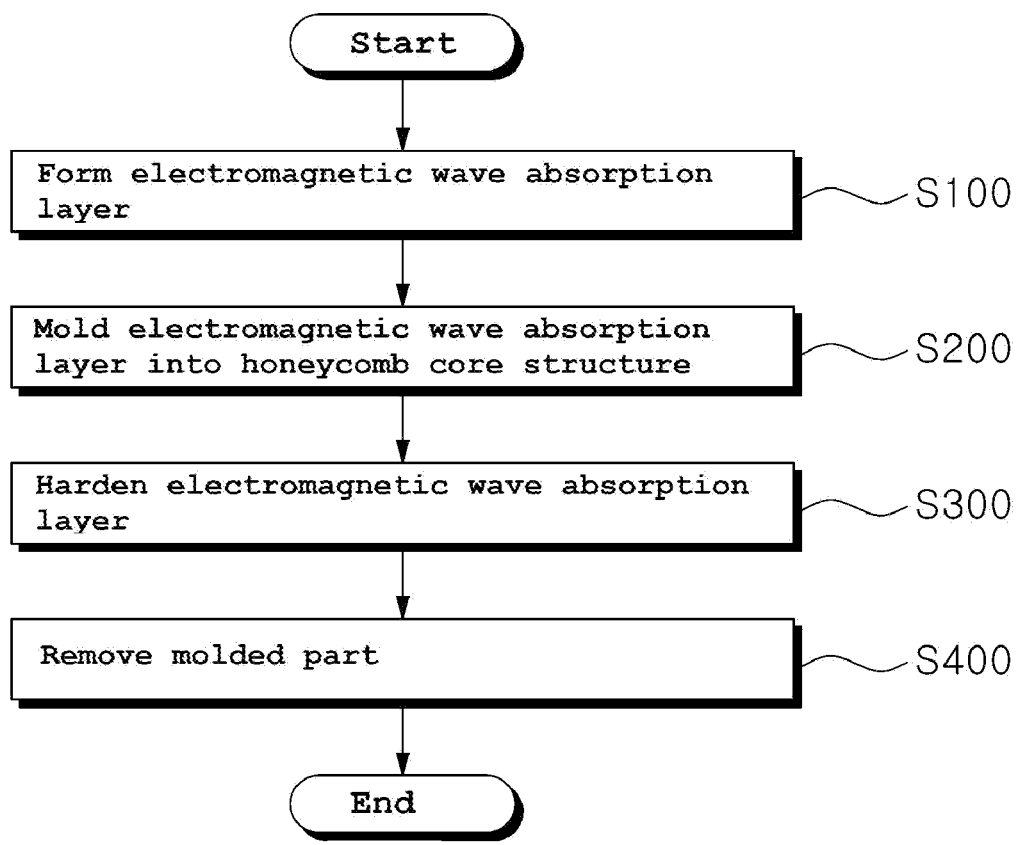
FIG. 2 is a flowchart illustrating a method of manufacturing the anti-icing honeycomb core composite according to an embodiment of the present invention.

FIG. 2 is a flowchart illustrating a method of manufacturing an anti-icing honeycomb core composite according to an embodiment of the present invention.

Referring to FIG. 2, the method of manufacturing an anti-icing honeycomb core composite 1 according to an embodiment of the present invention may include a forming step S100 of forming an electromagnetic wave absorption layer 10, a molding step S200 of molding the electromagnetic wave absorption layer into a honeycomb core structure 2, a hardening step S300 of hardening the electromagnetic wave absorption layer 10, and a removal step S400 of removing a molded part.

Figure 3:
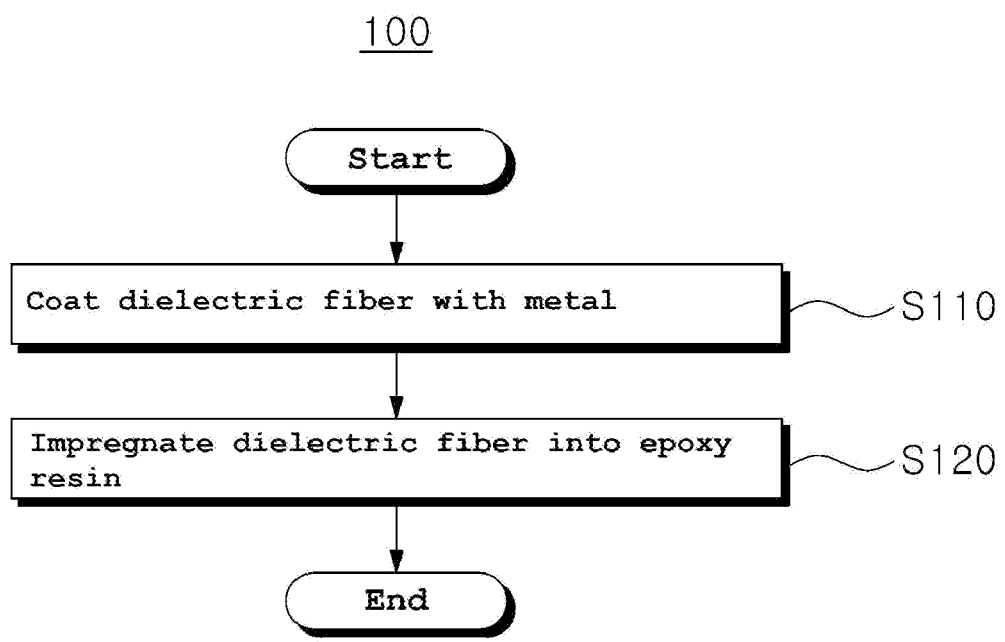
FIG. 3 is a flowchart illustrating a forming step in FIG. 1.

FIG. 3 is a flowchart illustrating the forming step in FIG. 1.

First, the forming step S100 is described with reference to FIG. 3.

The forming step S100 is a step of forming the electromagnetic wave absorption layer 10, and may include a coating step S110 of coating dielectric fiber with metal and an impregnation step S120 of impregnating the dielectric fiber into epoxy resin.

The coating step S110 is a step of coating the dielectric fiber, such as glass fiber, with the metal. For example, the dielectric fiber may be coated with the metal including nickel (Ni), iron (Fe), cobalt (Co), etc. by using an electroless plating method.

In this case, the metal may be coated on the dielectric fiber so that the thickness of a metal layer coated on the dielectric fiber is smaller than a skin depth, that is, a depth at which a current penetrates the material. If the metal is coated as described above, the dielectric fiber may be used as the electromagnetic wave absorption layer 10 because conductivity through the metal layer coated on the dielectric fiber is increased.

The impregnation step S120 is a step of impregnating, into the epoxy resin, the dielectric fiber coated with the metal. When the dielectric fiber is impregnated into the epoxy resin, mechanical properties, such as bending strength and hardness, can be improved.

Figure 4A:
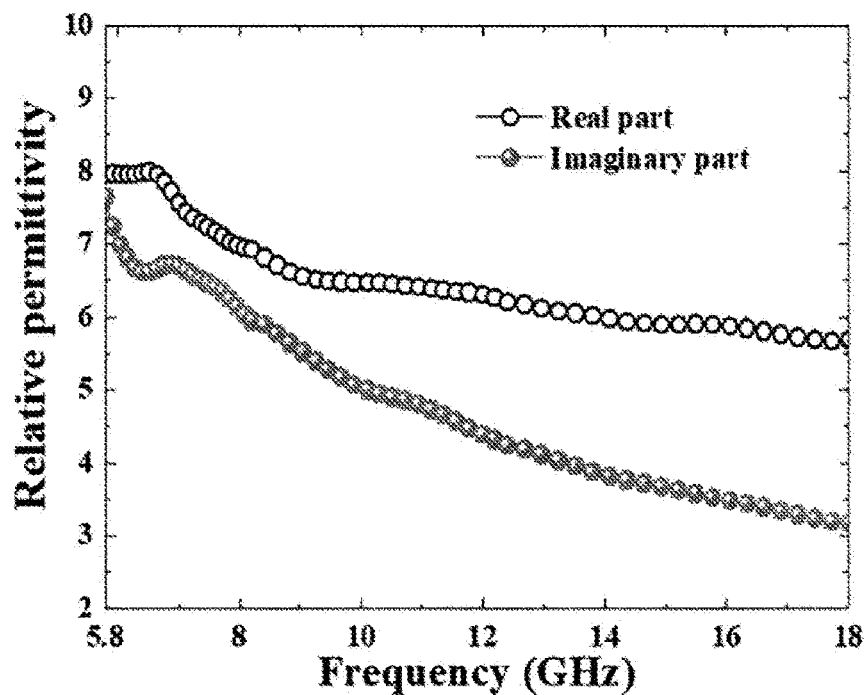
FIG. 4A is a graph illustrating complex permittivity of dielectric fiber coated with metal.
Figure 4B:
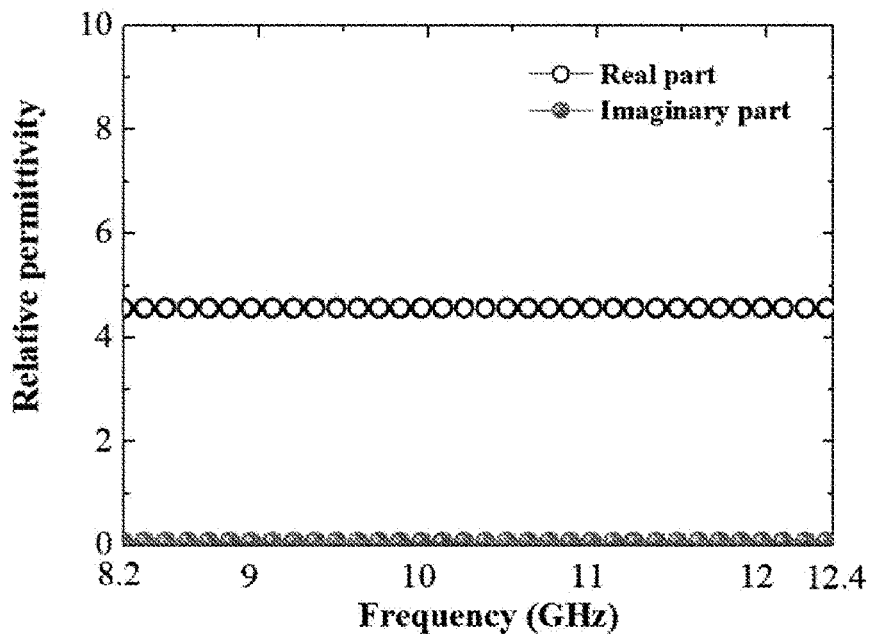
FIG. 4B is a graph illustrating complex permittivity of dielectric fiber not coated with metal.

FIGS. 4A and 4B are graphs illustrating complex permittivity of dielectric fiber depending on whether metal was coated.

Referring to FIGS. 4A and 4B, it may be seen that dielectric fiber on which metal was coated (FIG. 4A) has higher complex permittivity than dielectric fiber on which metal was not coated (FIG. 4B). It may be seen that as the electromagnetic wave absorption ability is proportional to the complex permittivity, the electromagnetic wave absorption ability of the dielectric fiber is improved by coating the metal on the dielectric fiber.

The dielectric fiber becomes the electromagnetic wave absorption layer 10 through the forming step S100. The electromagnetic wave absorption layer 10 may be formed to have a thickness of 0.117 mm to 0.468 mm so that an anti-icing honeycomb core having high heat generation efficiency is manufactured.

Figure 5:
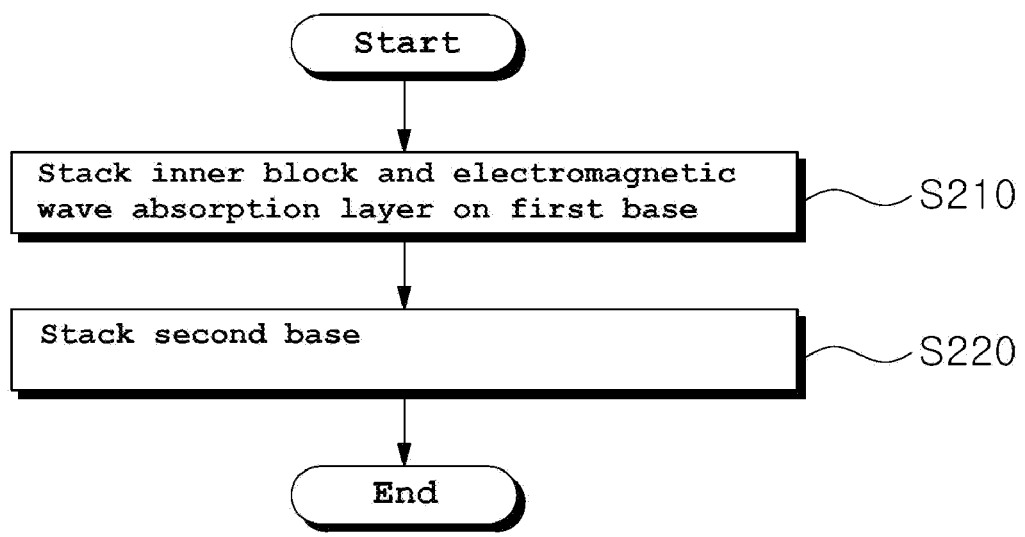
FIG. 5 is a flowchart illustrating a molding step in FIG. 2.

FIG. 5 is a flowchart illustrating the molding step in FIG. 2. FIGS. 6A-6D are diagrams illustrating an example of the molding step in FIG. 5.

Next, the molding step S200 is described with reference to FIGS. 5 and 6A-6D.

The molding step S200 is a step of molding the honeycomb core structure 2 by using a molded part including a first base 20, inner blocks 30, and a second base 40, and may include a first stacking step S210 of stacking the inner block and the electromagnetic wave absorption layer on the first base and a second stacking step S220 of stacking the second base.

Figure 6A:
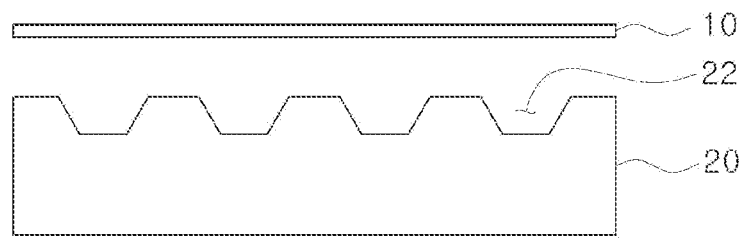
FIGS. 6a-6D are diagrams illustrating an example of the molding step in FIG. 5.

FIGS. 6A-6D are described as an example. The first stacking step S210 may include a step of first preparing the first base 20 in which grooves 22 have been formed in a plural number (FIG. 6A). The grooves 22 are formed in a length direction thereof. A cross section of the groove 22 which is perpendicular to the length direction may have a trapezoidal shape the lengths of top and lateral sides of which are identically a first length 1. The shortest distance between the grooves 22 may be the first length 1.

The first length 1 may be set to 2 mm to 10 mm so that the anti-icing honeycomb core composite 1 having high heat generation efficiency is manufactured, and may be set to 6 mm, preferably.

Figure 6B:
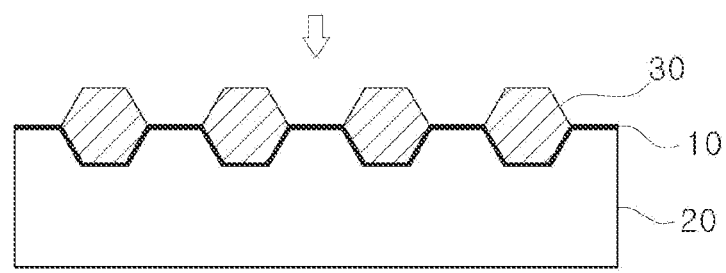

Furthermore, after the electromagnetic wave absorption layer 10 is stacked on the first base 20, the plurality of inner blocks 30 each having a hexagonal column shape is stacked by inserting the inner blocks 30 into the grooves 22 on which the electromagnetic wave absorption layer 10 has been stacked (FIG. 6B). Half of the hexagonal column shape of the inner block 30 may be inserted into the groove 22 so that the shape of the inner block 30 corresponds to a shape of the groove 22.

Figure 6C:
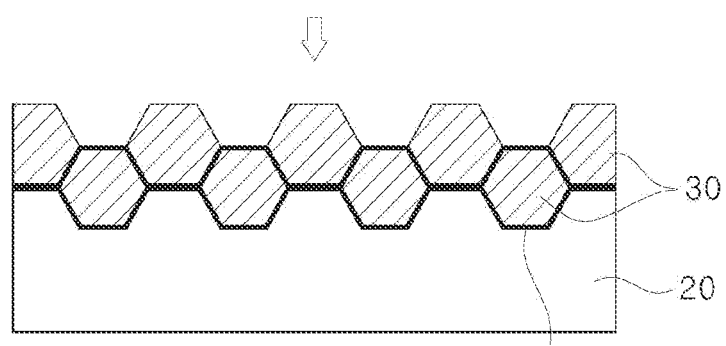

Next, the electromagnetic wave absorption layer 10 and the inner block 30 may be alternately stacked on the tops of the electromagnetic wave absorption layer 10 and the inner block 30 that have been stacked on the first base 20 (FIG. 6C). As the electromagnetic wave absorption layers 10 and the inner blocks 30 are alternately stacked on the top of the first base 20 as described above, the electromagnetic wave absorption layer 10 may have a honeycomb core structure disposed between the inner blocks 30. In this case, the electromagnetic wave absorption layer 10 may be finally stacked.

Figure 6D:
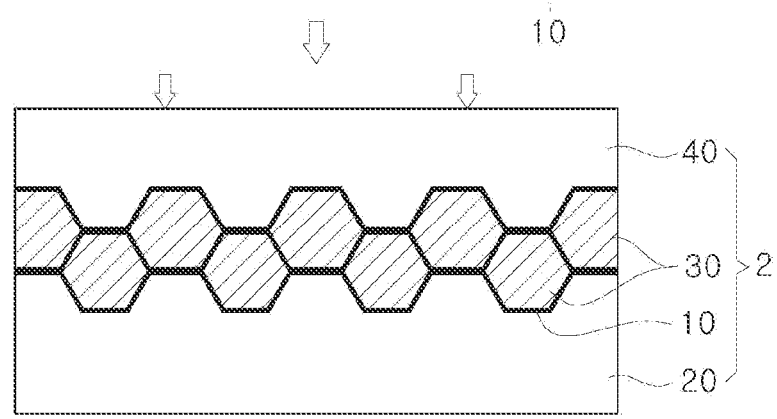

The second stacking step S220 is a step of covering the tops of the stacked electromagnetic wave absorption layers 10 and inner blocks 30 with the second base 40 after the electromagnetic wave absorption layers 10 and the inner blocks 30 are alternately stacked to a degree necessary to manufacture the anti-icing honeycomb core composite 1 (FIG. 6D).

The second base 40 may have the same shape as the first base 20. As the second base 40 has the same shape as the first base 20, the second base 40 may be stacked on the highest layer of the first base so that the second base 40 is matched with the electromagnetic wave absorption layer 10 staked at the top of the first base 20 (FIG. 6D).

The first base 20, the electromagnetic wave absorption layer 10, the inner block 30, and the second base 40 may form the honeycomb core structure 2 through the first stacking step S210 and the second stacking step S220 as described above.

Next, the hardening step S300 is described.

The hardening step S300 is a step of hardening the electromagnetic wave absorption layer 10 having the honeycomb core structure, which is included in the honeycomb core structure 2.

For example, in the hardening step S300, the electromagnetic wave absorption layer 10 may be hardened by pressurizing the first base 20 and the second base 40 so that the first base 20 and the second base 40 are forced in a direction in which the first base 20 and the second base 40 are in close proximity to each other.

Next, the removal step S400 is described.

The removal step S400 is a step of forming the anti-icing honeycomb core composite 1 by removing the molded part from the honeycomb core structure 2.

For example, if the inner block 30 is formed of a water-soluble material, the anti-icing honeycomb core composite 1 may be formed by removing the first base 20 and the second base 40 from the honeycomb core structure 2 by a physical force and removing the inner blocks 30 by spraying water.

The anti-icing honeycomb core composite 1 formed by the aforementioned method of manufacturing an anti-icing honeycomb core composite may have different electromagnetic wave absorption performance depending on the honeycomb core structure. The honeycomb core structure may be different depending on the thickness of the electromagnetic wave absorption layer 10 that constitutes the anti-icing honeycomb core composite 1 and the first length 1 of the groove 22 of the molded part.

Figure 7A:
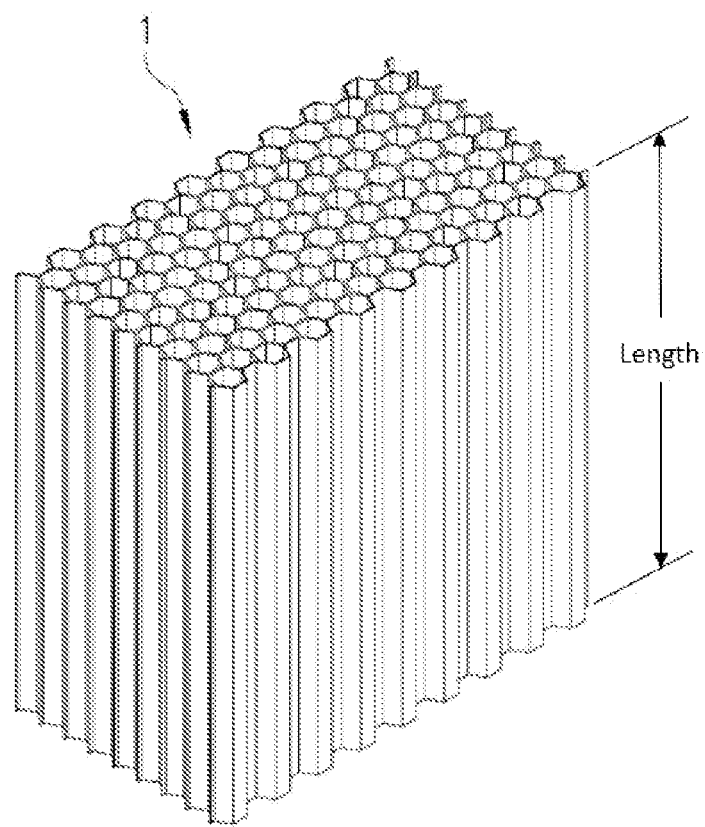
FIGS. 7A and B are diagrams illustrating a structure of the anti-icing honeycomb core composite according to an embodiment of the present invention.
Figure 7B:
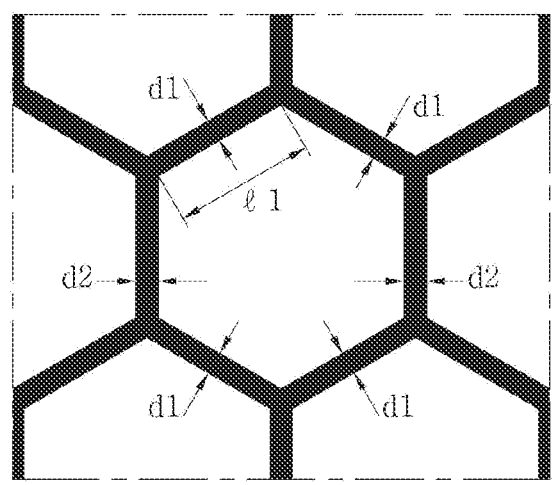

FIGS. 7A and 7B are diagrams illustrating a structure of the anti-icing honeycomb core composite according to an embodiment of the present invention.

Referring to FIGS. 7A and 7B, the anti-icing honeycomb core composite 1 manufactured by the method of manufacturing an anti-icing honeycomb core according to an embodiment of the present invention may have a honeycomb core structure including a gathering of a plurality of wall surfaces formed of the electromagnetic wave absorption layer 10 and a plurality of holes lengthily in a direction of a length of the anti-icing honeycomb core composite 1 (FIG. 7A).

Furthermore, a cross section of the wall surface that is perpendicular to the length direction may have a honeycomb structure including a gathering of a plurality of cells each having a regular hexagonal shape (FIG. 7B). In this case, the length of one side of the cell may be differently formed depending on the first length 1 that limits the structure of the groove 22 of the molded part. The thickness of the wall surface of the cell may be differently formed depending on the thickness of the electromagnetic wave absorption layer 10.

For example, the length of one side of the cell may be 2 mm to 10 mm by setting, to 2 mm to 10 mm, the first length 1 that limits the structure of the groove 22 of the molded part in the molding step S200.

Furthermore, by forming the electromagnetic wave absorption layer 10 to have a thickness of 0.117 mm to 0.468 mm in the forming step S100, a thickness $d_1$ of each of four sides of the cell formed of one electromagnetic wave absorption layer 10 may be 0.117 mm to 0.468 mm. A thickness $d_2$ of each of two sides of the cell that are formed due to an overlap between two electromagnetic wave absorption layers 10 and that face each other may be 0.234 mm to 0.936 mm.

Hereinafter, an anti-icing honeycomb core composite 1 according to an embodiment of the present invention is described.

The anti-icing honeycomb core composite 1 according to an embodiment of the present invention has the same structure as the anti-icing honeycomb core composite 1 manufactured by the aforementioned method of manufacturing an anti-icing honeycomb core composite, but a method of manufacturing the same may be different.

That is, the anti-icing honeycomb core composite 1 may have a honeycomb core structure lengthily including a plurality of holes in a length direction thereof, and may have a honeycomb structure including a gathering of cells a cross section of each of which has a regular hexagonal shape (FIG. 7A).

The anti-icing honeycomb core composite 1 can be constructed lightly and firmly because the anti-icing honeycomb core composite 1 is formed as the honeycomb core structure as described above and may have empty spaces formed therein. Furthermore, the anti-icing honeycomb core composite 1 may have high heat preservation efficiency because heated air is maintained within the internal empty spaces.

The length of one side of the cell may be 2 mm to 10 mm, and may be preferably 6 mm (FIG. 7B).

Furthermore, the thickness d1 of each of the four sides of the cell formed of one electromagnetic wave absorption layer 10 may be 0.117 mm to 0.468 mm. The thickness d2 of each of the two sides of the cell that are formed due to an overlap between two electromagnetic wave absorption layers 10 and that face each other may be 0.234 mm to 0.936 mm (FIG. 7B).

Figure 8:
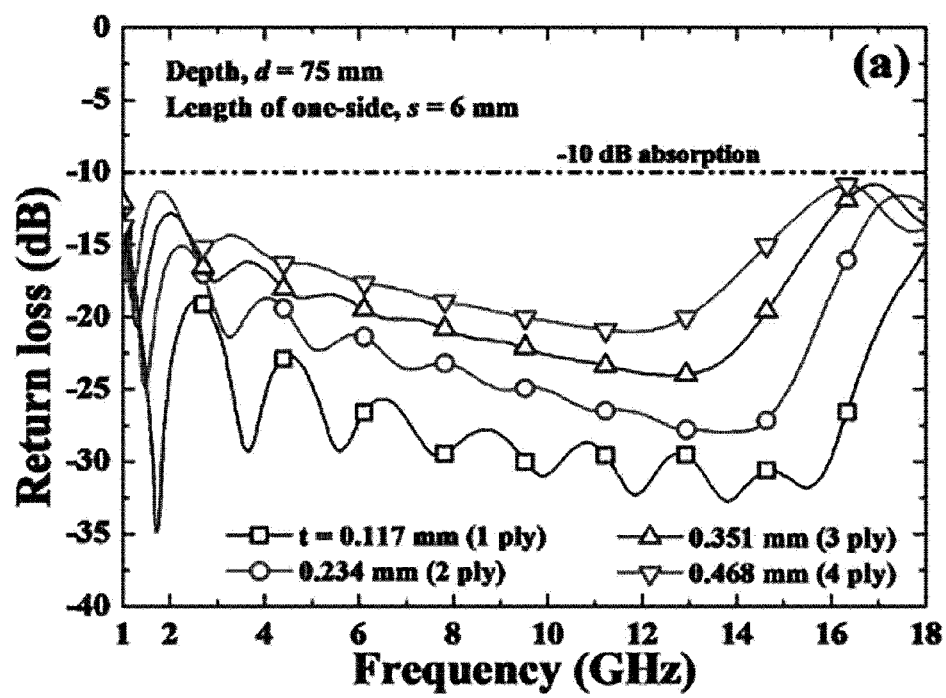
FIG. 8 is a graph illustrating electromagnetic wave absorption performance according to thicknesses of wall surfaces of cells of the anti-icing honeycomb core composite according to an embodiment of the present invention.

FIG. 8 is a graph illustrating electromagnetic wave absorption performance according to thicknesses of wall surfaces of cells of the anti-icing honeycomb core composite.

Referring to FIG. 8, when an electromagnetic wave having a frequency of 1 GHz to 18 GHz is applied to the anti-icing honeycomb core composite 1 including a cell in which the thickness d1 of each of the four sides thereof is 0.117 mm to 0.468 mm and the thickness d2 of each of the two sides thereof that face each other is 0.234 mm to 0.936 mm, a reflection loss is −10 dB or less.

That is, the anti-icing honeycomb core composite 1 in which the thickness d1 of each of the four sides of the wall surface of the cell is 0.117 mm to 0.468 mm and the thickness d2 of each of the two sides thereof that face each other is 0.234 mm to 0.936 mm may absorb an electromagnetic wave of 90% or more, which has the frequency of 1 GHz to 18 GHz, and may have high heat generation efficiency.

Figure 9:
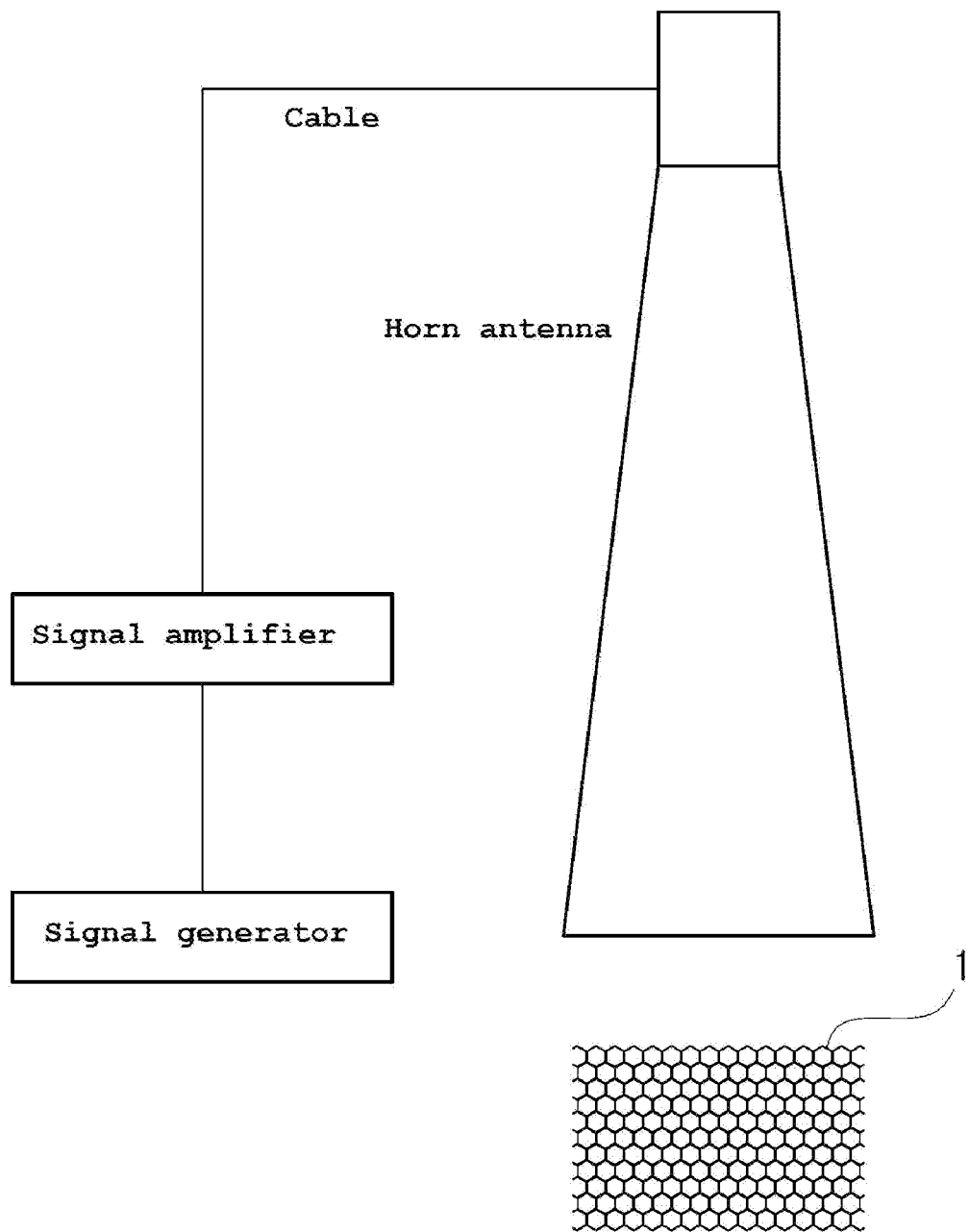
FIG. 9 is a diagram illustrating an electromagnetic wave generation apparatus for applying an electromagnetic wave to the anti-icing honeycomb core composite according to an embodiment of the present invention.
Figure 10:
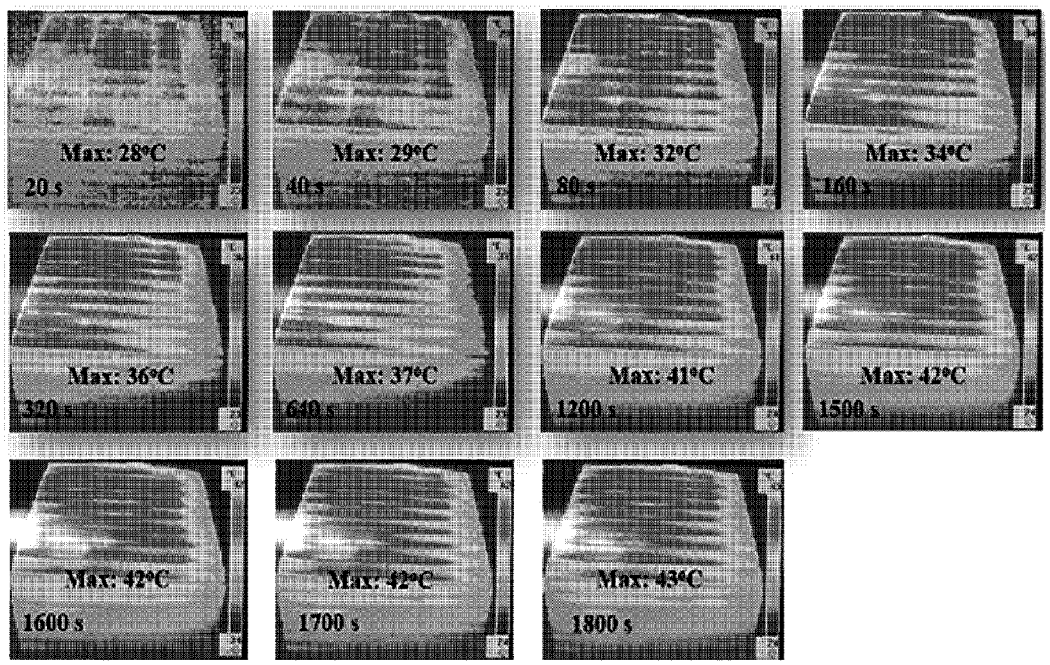
FIG. 10 is a diagram illustrating a temperature change of the anti-icing honeycomb core composite according to the application of an electromagnetic wave to the electromagnetic wave generation apparatus of FIG. 9.

FIG. 9 is a diagram illustrating an electromagnetic wave generation apparatus for applying an electromagnetic wave to the anti-icing honeycomb core composite. FIG. 10 is a diagram illustrating a temperature change of the anti-icing honeycomb core composite according to the application of an electromagnetic wave to the electromagnetic wave generation apparatus of FIG. 9.

Referring to FIG. 10, it may be seen that a temperature of the anti-icing honeycomb core composite 1 rose over time when the electromagnetic wave generation apparatus of FIG. 9 applied, to the anti-icing honeycomb core composite 1, an electromagnetic wave having a frequency of 5.8 GHz with the output of 25 W.

When an electromagnetic wave having a specific frequency band is applied to the anti-icing honeycomb core composite 1, power loss density may be calculated by Equation 1 below.

$$P_c = \pi * f * \varepsilon_0 * \varepsilon_r^{im} * |e^2|$$ [Equation 1]

wherein $P_e$ is power loss density, f is a frequency of the electromagnetic wave, $\varepsilon_0$ is a dielectric constant in vacuum, $\varepsilon_r^{im}$ is an imaginary part in the complex permittivity of a material, and e is the intensity of an electric field.

Furthermore, a heat generation temperature of the anti-icing honeycomb core composite 1 over time may be calculated by using the power loss density calculated by Equation 1 and Equation 2.

$$\rho * C_p * \partial T/\partial t = k * \nabla^2 T + P_e$$ [Equation 2]

wherein $\rho$ is the density of the material, $C_p$ is specific heat of the material, k is thermal conductivity of the material, and T is a temperature.

Figure 11:
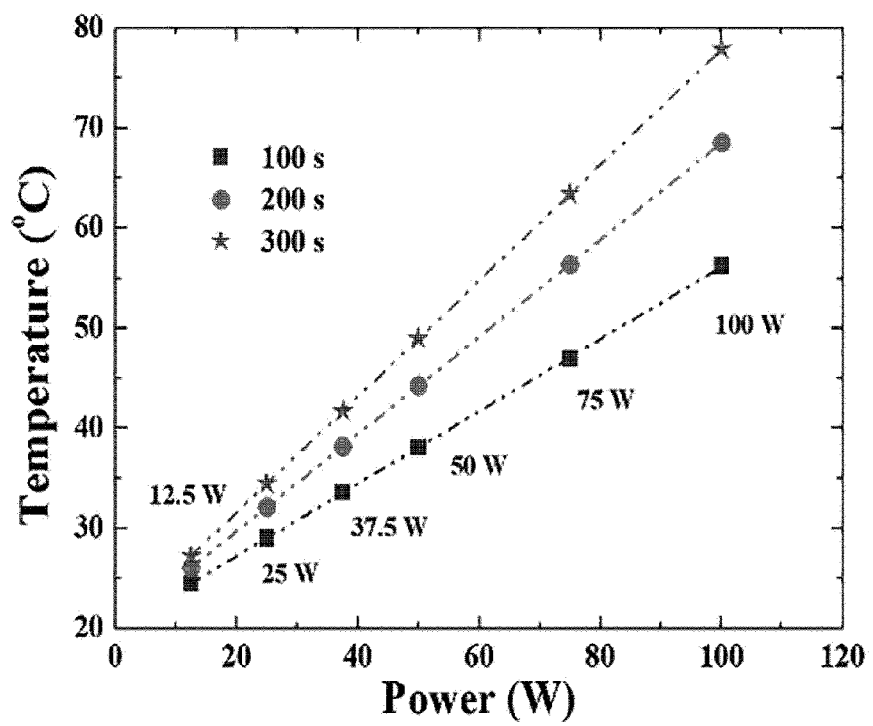
FIG. 11 is a graph illustrating a temperature of the anti-icing honeycomb core composite according to the output and application times of an electromagnetic wave according to an embodiment of the present invention.

FIG. 11 is a graph illustrating a temperature of the anti-icing honeycomb core composite according to the output and application times of an electromagnetic wave.

Referring to FIG. 11, it may be seen that the temperature of the anti-icing honeycomb core composite 1 rose in proportion to the output and application times of the electromagnetic wave.

Hereinafter, actions and effects of the anti-icing honeycomb core composite and the method of manufacturing the same according to the present invention are specifically described.

First, after dielectric fiber is coated with metal, the electromagnetic wave absorption layer 10 is formed by impregnating the dielectric fiber into epoxy resin.

The formed electromagnetic wave absorption layer 10 is molded into the honeycomb core structure 2 by using a molded part. Specifically, the honeycomb core structure 2 is formed by alternately stacking the electromagnetic wave absorption layer 10 and the inner block 30 so that the electromagnetic wave absorption layer 10 has a honeycomb core structure between the first base 20 in which the grooves 22 have been formed and the second base 40.

In order to increase heat generation efficiency of the anti-icing honeycomb core composite 1, the length and thickness of a side of a cell of the electromagnetic wave absorption layer 10 that forms the honeycomb core structure 2 may have specific values. For example, by molding the honeycomb core structure 2 by specifying a thickness of the electromagnetic wave absorption layer 10 and a shape of the groove 22, the length and thickness of the side of the cell of the electromagnetic wave absorption layer 10 having the honeycomb core structure may have specific values.

Specifically, the honeycomb core structure 2 may be molded by limiting the thickness of the electromagnetic wave absorption layer 10 and the shape of the groove 22 so that the lengthy of one side of the cell of the electromagnetic wave absorption layer 10 that forms the honeycomb core structure 2 is 2 mm to 10 mm, the thickness d1 of each of the four sides of the cell is 0.117 mm to 0.468 mm, and the thickness d2 of each of the two sides of the cell that face each other is 0.234 mm to 0.936 mm.

The anti-icing honeycomb core composite 1 is manufactured by hardening the molded honeycomb core structure 2 and removing the molded part.

When the manufactured anti-icing honeycomb core composite 1 is installed in a structure, such as an aircraft, and an electromagnetic wave is applied, the electromagnetic wave absorption layer 10 including the dielectric fiber on which the metal has been plated prevents the structure, such as an aircraft, from being frozen by generating heat.

In this case, when the electromagnetic wave is applied to a specific portion of the anti-icing honeycomb core composite 1, heat may be generated from only the specific portion of the anti-icing honeycomb core composite 1 to which the electromagnetic wave has been applied.

As described above, the anti-icing honeycomb core composite according to the present invention provides an effect in that the anti-icing honeycomb core composite can be lightly manufactured by having the honeycomb core structure.

Furthermore, the anti-icing honeycomb core composite provides an effect in that it can increase heat preservation efficiency because it can contain heated air within the hole by having the honeycomb core structure.

Furthermore, the anti-icing honeycomb core composite provides an effect in that it can increase heat generation efficiency because the anti-icing honeycomb core composite is coated with metal and the size and thickness of the cell are limited.

Furthermore, the anti-icing honeycomb core composite provides an effect in that it can select a portion that requires the generation of heat and generate heat from the selected portion because heat is generated from only a portion that absorbs an electromagnetic wave.

The present invention has been described in detail above through the representative embodiments. However, a person having ordinary knowledge in the art to which the present invention pertains will understand that the aforementioned embodiments may be variously modified without departing from the category of the present invention. Accordingly, the scope of right of the present invention should not be limited to the described embodiments, and should be defined by all changes or modified forms that are derived from the claims and equivalent concepts thereof in addition to the attached claims.

DESCRIPTION OF REFERENCE NUMERALS

1: anti-icing honeycomb core composite
2: honeycomb core structure
10: electromagnetic wave absorption layer
20: first base
22: groove
30: inner block
40: second base

The invention claimed is:

1. An anti-icing honeycomb core composite comprising a plurality of holes that is formed by a gathering of a plurality of wall surfaces comprising an electromagnetic wave absorption layer lengthily in a direction of a length of the anti-icing honeycomb core composite,
   wherein the wall surfaces formed of the electromagnetic wave absorption layer are constructed to absorb an electromagnetic wave and to have a honeycomb structure comprising a gathering of a plurality of cells,
   a cross section of each of the plurality of cells is perpendicular to the length of the core and has a regular hexagonal shape, and a first length of each side of the cross section of each cell perpendicular to the length of the core is 2 mm to 10 mm,
   each of a pair of sides of the cross section of each cell which sides face opposite each other and have a first thickness of 0.234 mm to 0.936 mm across the first length, and
   each of a remaining four sides of the cross section of each cell which four sides include two pairs of sides, where each pair of sides includes adjacent sides of each cell which have a second thickness of 0.117 mm to 0.468 mm across the first length.

2. The anti-icing honeycomb core composite of claim 1, wherein the wall surface is formed of a dielectric fiber on which metal has been plated.

3. The anti-icing honeycomb core composite of claim 2, wherein the metal comprises iron (Fe) or cobalt (Co).

4. The anti-icing honeycomb core composite of claim 3, wherein heat that is generated over time is determined by Equation 1 and Equation 2 below:

$$P_e = \pi * f * \varepsilon_0 * \varepsilon_r^{im} * |e^2| \qquad \text{[Equation 1]}$$

$$\rho * C_p * \partial T/\partial t = k * \nabla^2 T + P_e \qquad \text{[Equation 2]}$$

wherein $P_e$ is power loss density, f is a frequency of the electromagnetic wave, $\varepsilon_0$ is a dielectric constant in vacuum, $\varepsilon_r^{im}$ is an imaginary part in complex permittivity of a material, and e is intensity of an electric field, $\rho$ is density of the material, $C_p$ is specific heat of the material, k is thermal conductivity of the material, and T is a temperature.

5. The anti-icing honeycomb core composite of claim 1, wherein a given portion of the anti-icing honeycomb core composite generates heat when the electromagnetic wave is applied to the given portion,
   the temperature of the anti-icing honeycomb core composite rises in proportion to the output and application times of the electromagnetic wave.

\* \* \* \* \*